US010039011B2

(12) United States Patent
Bahng et al.

(10) Patent No.: US 10,039,011 B2
(45) Date of Patent: Jul. 31, 2018

(54) POLARIZATION BEAMFORMING COMMUNICATION METHOD AND APPARATUS

(71) Applicant: Electronics and Telecommunications Research Institute, Daejeon (KR)

(72) Inventors: Seungjae Bahng, Daejeon (KR); Gosan Noh, Daejeon (KR); Youn Ok Park, Daejeon (KR); Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 146 days.

(21) Appl. No.: 14/951,649

(22) Filed: Nov. 25, 2015

(65) Prior Publication Data

US 2016/0302082 A1 Oct. 13, 2016

(30) Foreign Application Priority Data

Apr. 10, 2015 (KR) ........................ 10-2015-0051171

(51) Int. Cl.
| | | |
|---|---|---|
| H04M 1/00 | (2006.01) | |
| H04W 16/28 | (2009.01) | |
| H04B 7/06 | (2006.01) | |
| H04B 7/10 | (2017.01) | |

(52) U.S. Cl.
CPC .......... *H04W 16/28* (2013.01); *H04B 7/0617* (2013.01); *H04B 7/10* (2013.01)

(58) Field of Classification Search
CPC .......... H04B 7/02; H04B 7/024; H04B 7/028; H04B 7/0608; H04B 7/0634
See application file for complete search history.

(56) References Cited

U.S. PATENT DOCUMENTS

| | | | |
|---|---|---|---|
| 2007/0164902 A1 | 7/2007 | Bang et al. | |
| 2010/0298015 A1* | 11/2010 | Medbo ................. | H04B 7/0617 455/501 |
| 2012/0281672 A1* | 11/2012 | Ohm ..................... | H04B 7/185 370/331 |
| 2013/0165059 A1 | 6/2013 | Son et al. | |
| 2014/0106807 A1 | 4/2014 | Bang et al. | |

(Continued)

FOREIGN PATENT DOCUMENTS

KR 1020130073131 A 7/2013

OTHER PUBLICATIONS

Seungjae Bahng et al., "Estimation of Azimuth, Elevation Angles and Polarization with a Planar Array," Journal of Korean Institute of Communications and Information Sciences (KICS), Jun. 2014, pp. 646-647.

*Primary Examiner* — Alvin Zhu
(74) *Attorney, Agent, or Firm* — William Park & Associates Ltd.

(57) ABSTRACT

The polarization beamforming communication apparatus of a base station estimates an azimuth, elevation, and polarization of each of terminals using a reference signal of a terminal received through a plurality of dual polarization antennas, determines a stream to be transmitted based on the azimuth, elevation, and polarization of the terminal, and sends the stream to be transmitted to the terminal through a polarization-matched beam formed in accordance with each of the plurality of dual polarization antennas using the azimuth, elevation, and polarization of the terminal.

12 Claims, 9 Drawing Sheets

(56) References Cited

U.S. PATENT DOCUMENTS

2015/0333884 A1* 11/2015 Athley .................. H04L 5/0048
375/295
2016/0205508 A1* 7/2016 Sanderovich ......... G01S 5/0009
455/456.1

* cited by examiner

POLARIZATION BEAMFORMING COMMUNICATION METHOD AND APPARATUS

CROSS-REFERENCE TO RELATED APPLICATION

This application claims priority to and the benefit of Korean Patent Application No. 10-2015-0051171 filed in the Korean Intellectual Property Office on Apr. 10, 2015, the entire contents of which are incorporated herein by reference.

BACKGROUND OF THE INVENTION (a) Field of the Invention

The present invention relates to a polarization beamforming communication method and apparatus.

(b) Description of the Related Art

The attenuation of a transmission loss in a millimeter wave band is 100 times or more that of a transmission loss in a common microwave band. For example, the attenuation of a signal of a 60 GHz band is about 144 times greater than that of a signal of a 5 GHz band. Accordingly, in the millimeter wave band, a signal is transmitted to a target terminal with maximum power. For this reason, a technology for forming a beam having a narrow width using many antennas and transmitting the beam has been in the spotlight as a prospect technology in the millimeter wave band. Furthermore, the use of a beam having a narrow width in the millimeter wave band results in a communication environment in which a line-of-sight including a very small number of reflection waves due to the narrow beam width is dominant.

Polarization indicates a polarity generated by an electric field on a plane perpendicular to the axis in which an electromagnetic wave travels when the electromagnetic wave travels. Maximum energy may be transmitted when the polarization of a transmission stage is fully identical with that of a reception stage. If the polarization of the transmission stage is orthogonal to that of the reception stage, most transmission energy is unable to be transmitted to the reception stage. Furthermore, if vertical and horizontal dual polarization antennas orthogonal to each other are used in the transmission stage and the vertical and horizontal antennas are made to have the same RF path, various transmission polarizations may be generated through signal processing in the baseband.

In general, in a communication environment in which polarization is changed in a reflected wave and a line-of-sight is dominant, a technology for matching transmission polarization with reception polarization is very important in order to improve transmission efficiency because a reflected wave is rarely present.

SUMMARY OF THE INVENTION

The present invention has been made in an effort to provide a polarization beamforming communication method and apparatus having an advantage of improving transmission efficiency in a communication environment in which a line-of-sight is dominant.

According to an embodiment of the present invention, the polarization beamforming communication method of a base station including a planar dual polarization antenna array is provided. The polarization beamforming communication method includes: estimating the azimuth, elevation, and polarization of each of terminals using the reference signal of the terminal received through a plurality of dual polarization antennas of the planar dual polarization antenna array; determining a stream to be transmitted based on the azimuth, elevation, and polarization of the terminal; and sending the stream to be transmitted to the terminal through a polarization-matched beam formed in accordance with each of the plurality of dual polarization antennas using the azimuth, elevation, and polarization of the terminal.

Sending the stream to be transmitted may include: generating a horizontal polarization signal and a vertical polarization signal from the stream to be transmitted to the terminal using the azimuth, elevation, and polarization of the terminal; generating a steering vector for the plurality of dual polarization antennas in accordance with the stream to be transmitted to the terminal using the azimuth and elevation of the terminal; and performing beamforming on the horizontal polarization signal and the vertical polarization signal corresponding to the terminal using the steering vector corresponding to the terminal.

Generating the horizontal polarization signal and the vertical polarization signal may include calculating a horizontal component weight value and vertical component weight value of the terminal using the azimuth, elevation, and polarization of the terminal, and generating a horizontal component signal and a vertical component signal to be transmitted to the terminal by respectively multiplying the horizontal component weight value and vertical component weight value corresponding to the stream to be transmitted to the terminal.

Sending the stream to be transmitted may include combining the beamformed horizontal polarization signals of the terminal for each of the dual polarization antennas, combining the beamformed vertical polarization signals of the terminal for each of the dual polarization antennas, and sending the combined horizontal polarization signal and the combined vertical polarization signal through a corresponding dual polarization antenna.

Generating the steering vector may include generating a steering vector to be applied to each row of the planar dual polarization antenna array using the azimuth, and generating a steering vector to be applied to each column of the planar dual polarization antenna array using the azimuth.

Generating the horizontal polarization signal and the vertical polarization signal may include generating a horizontal component weight value of the dual polarization antenna in the planar dual polarization antenna array using the horizontal component of the polarization, and generating the vertical component weight value of the dual polarization antenna in the planar dual polarization antenna array using the vertical component of the polarization.

According to another exemplary embodiment of the present invention, the polarization beamforming communication method of a base station including a plurality of dual polarization antennas is provided. The polarization beamforming communication method includes estimating the azimuth and polarization of each of terminals using the reference signal of a terminal received through the plurality of dual polarization antennas, determining a stream to be transmitted based on the azimuth and polarization of the terminal, and sending the stream to be transmitted to the terminal through a polarization-matched beam formed in accordance with each of the plurality of dual polarization antennas using the azimuth and polarization of the terminal.

Sending the stream to be transmitted may include generating a steering vector for the plurality of dual polarization antennas in accordance with the stream to be transmitted to the terminal using the azimuth of the terminal, performing beamforming on the stream to be transmitted to the terminal using a corresponding steering vector, calculating a horizontal component weight value and a vertical component weight value for the dual polarization antenna in accordance with the terminal using the azimuth of the terminal and the polarization, and generating a horizontal component signal and a vertical component signal for the dual polarization antenna using the horizontal component weight value and vertical component weight value for the dual polarization antenna corresponding to a beamformed stream of the terminal.

Sending the stream to be transmitted may include combining the horizontal polarization signals of the terminal for each of the dual polarization antennas, combining the vertical polarization signals of the terminal for each of the dual polarization antennas, and sending the combined horizontal polarization signal and the combined vertical polarization signal through a corresponding dual polarization antenna.

Sending the stream to be transmitted may include calculating a horizontal component weight value and a vertical component weight value in accordance with the stream to be transmitted to the terminal using the azimuth of the terminal and the polarization, generating a horizontal polarization signal and a vertical polarization signal of the terminal using the horizontal component weight value and the vertical component weight value in accordance with the stream to be transmitted to the terminal, generating a steering vector for the plurality of dual polarization antennas in accordance with the terminal using the azimuth of the terminal, and performing beamforming on the horizontal polarization signal and the vertical polarization signal corresponding to the terminal using the steering vector corresponding to the terminal.

Sending the stream to be transmitted further may include combining the horizontal polarization signals of the terminal for each of the dual polarization antennas, combining the vertical polarization signals of the terminal for each of the dual polarization antennas, and sending the combined horizontal polarization signal and the combined vertical polarization signal through a corresponding dual polarization antenna.

According to yet another exemplary embodiment of the present invention, the polarization beamforming communication apparatus of a base station is provided. The polarized beamforming communication apparatus includes a planar dual polarization antenna array, an estimation unit, a control unit, a transmission polarization processing unit, a transmission beamforming unit, and a combination unit. The planar dual polarization antenna array includes a plurality of dual polarization antennas. The estimation unit estimates the azimuth, elevation, and polarization of each of terminals from a reference signal received from the terminal through the planar dual polarization antenna array. The control unit determines a stream to be transmitted based on the azimuth, elevation, and polarization of the terminal. The transmission polarization processing unit generates a horizontal polarization signal and a vertical polarization signal from the stream to be transmitted to the terminal using the azimuth, elevation, and polarization of the terminal. The transmission beamforming unit performs beamforming on the horizontal polarization signal and the vertical polarization signal to be transmitted to the terminal in accordance with each of the plurality of dual polarization antennas using the azimuth and elevation of the terminal. Furthermore, the combination unit delivers a beamformed horizontal polarization signal of the terminal for the dual polarization antenna and a beamformed vertical polarization signal of the terminal for the dual polarization antenna to a corresponding dual polarization antenna.

The transmission beamforming unit may generate a steering vector for the plurality of dual polarization antennas in accordance with the terminal using the azimuth and elevation of the terminal, and perform beamforming on the vertical polarization signal and horizontal polarization signal to be transmitted to the terminal using respective corresponding steering vectors.

The transmission polarization processing unit may calculate a horizontal component weight value and a vertical component weight value of the terminal using the azimuth, elevation, and polarization of the terminal, and generate a horizontal component signal and a vertical component signal to be transmitted to the terminal by respectively multiplying the stream to be transmitted to the terminal by the horizontal component weight value and the vertical component weight value.

The combination unit may include a horizontal component combination unit corresponding to each of the dual polarization antennas and a vertical component combination unit corresponding to each of the dual polarization antennas. The horizontal component combination unit may combine the beamformed horizontal component signals of the terminal for a corresponding dual polarization antenna, and the vertical component combination unit may combine the beamformed vertical component signals of the terminal for a corresponding dual polarization antenna.

The transmission beamforming unit may generate a steering vector to be applied to each row of the planar dual polarization antenna array using the azimuth and generate a steering vector to be applied to each column of the planar dual polarization antenna array using the azimuth.

The transmission polarization processing unit may generate a horizontal component weight value and a vertical component weight value of the dual polarization antenna in the planar dual polarization antenna array using horizontal and vertical components of the polarization, and generate the horizontal polarization signal and the vertical polarization signal by applying the horizontal component weight value and the vertical component weight value to the stream to be transmitted to the terminal.

DETAILED DESCRIPTION OF THE EMBODIMENTS

In the following detailed description, only certain exemplary embodiments of the present invention have been illustrated and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, in addition, unless explicitly described to the contrary, the word "comprise" and variations such as "comprises" or "comprising" will be understood to imply the inclusion of stated elements but not the exclusion of any other elements.

Figure 1:
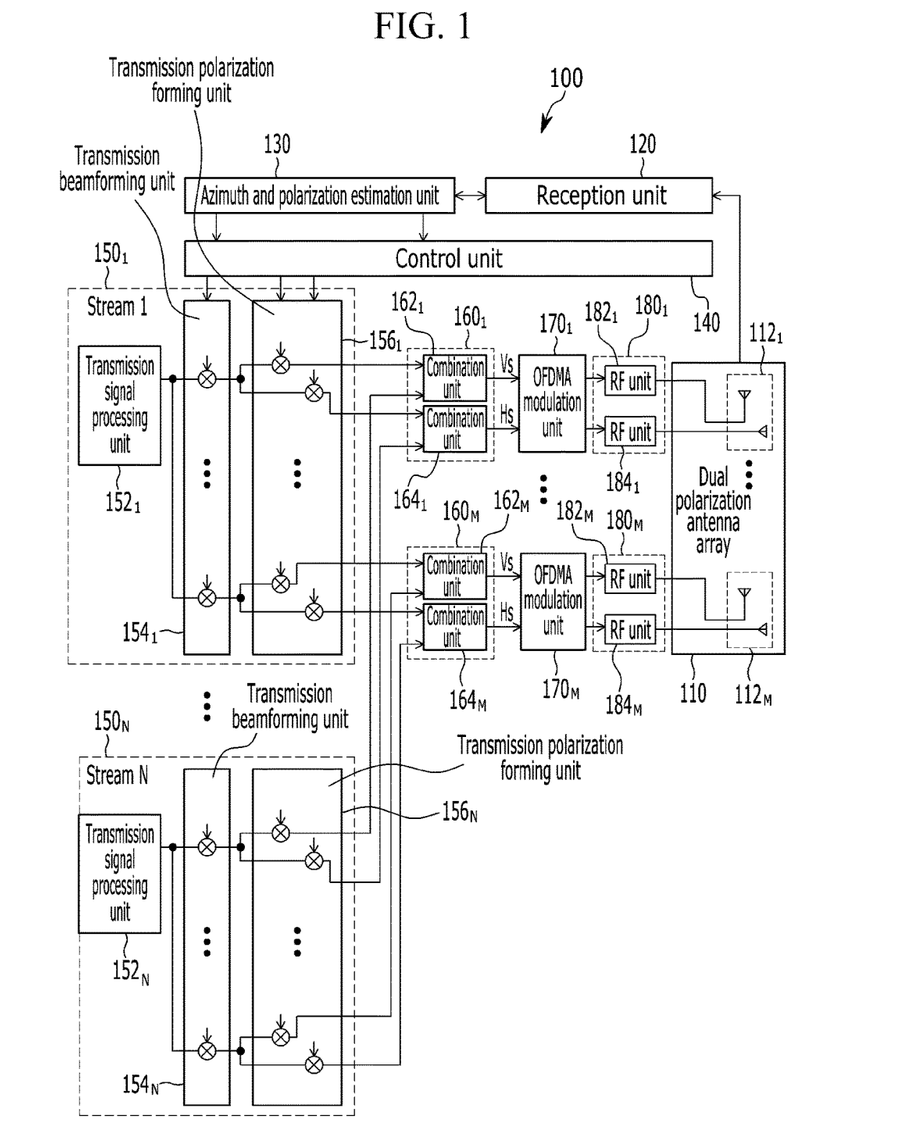
FIG. 1 is a diagram illustrating a polarization beamforming communication apparatus in accordance with an exemplary embodiment of the present invention.

A polarization beamforming communication method and apparatus in accordance with exemplary embodiments of the present invention are described in detail below with reference to the accompanying drawings. FIG. 1 is a diagram illustrating a polarization beamforming communication apparatus in accordance with an exemplary embodiment of the present invention, FIG. 2 is a diagram illustrating an example of the polarization state of each terminal in accordance with an exemplary embodiment of the present invention, and FIG. 3 is a diagram illustrating an example of the transmission polarization beam of a communication apparatus in accordance with an exemplary embodiment of the present invention.

Referring to FIG. 1, the communication apparatus 100 may include a dual polarization antenna array 110, a reception unit 120, an azimuth and polarization estimation unit 130, a control unit 140, a plurality of stream processing units 150$_1$-150$_N$, a plurality of combination units 160$_1$-160$_M$, a plurality of OFDMA modulation units 170$_1$-170$_M$, and a plurality of transmission units 180$_1$-180$_M$. The plurality of stream processing units 150$_1$-150$_N$ may respectively include a plurality of transmission signal processing units 152$_1$-152$_N$, a plurality of transmission beamforming units 154$_1$-154$_N$, and a plurality of transmission polarization forming units 156$_1$-156$_N$. In this case, N may be a maximum number of transmission streams that may be transmitted by the communication apparatus 100, and M may be the number of dual polarization antennas. Such a communication apparatus 100 may be included in a base station.

The dual polarization antenna array 110 includes a plurality of dual polarization antennas 112$_1$-112$_M$. The dual polarization antenna array 110 includes the array of the plurality of dual polarization antennas 112$_1$-112$_M$. The plurality of dual polarization antennas 112$_1$-112$_M$ are respectively connected to the plurality of transmission units 180$_1$-180$_M$ and the plurality of OFDMA modulation units 170$_1$-170$_M$.

Figure 2:
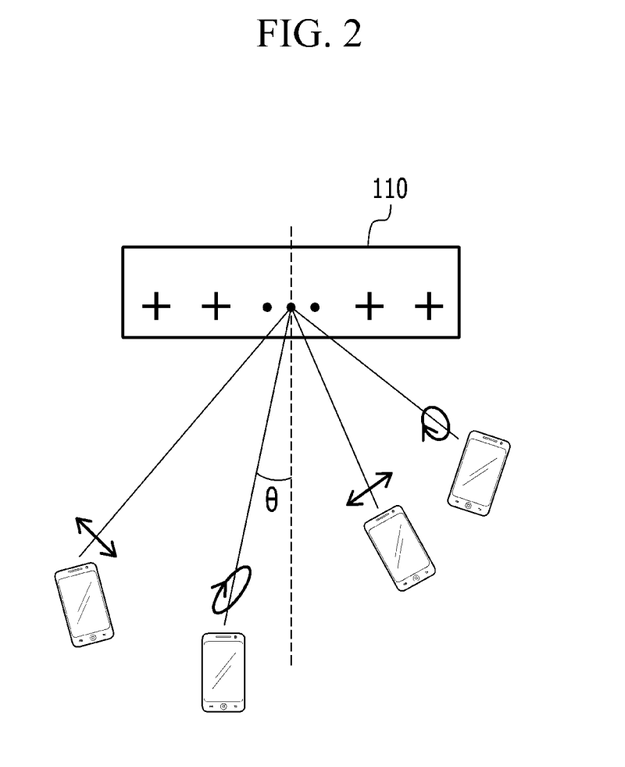
FIG. 2 is a diagram illustrating an example of a polarization state of each terminal in accordance with an exemplary embodiment of the present invention.
Figure 3:
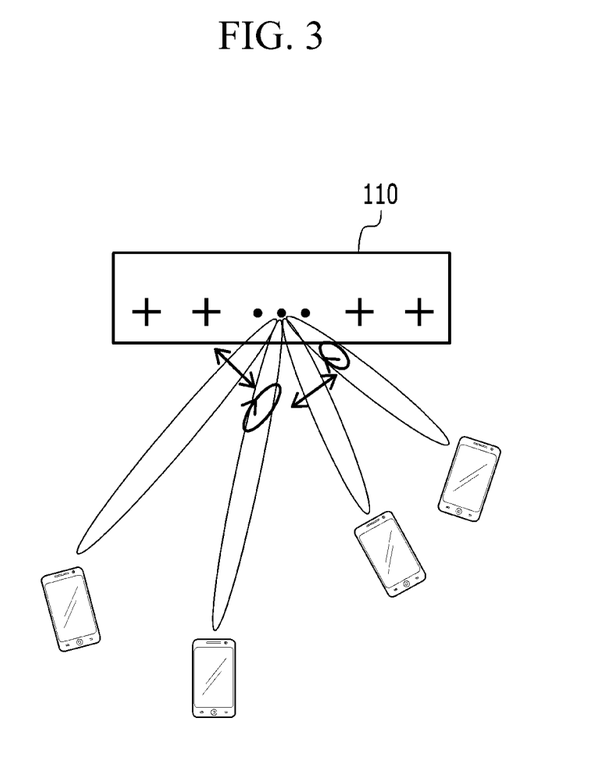
FIG. 3 is a diagram illustrating an example of a transmission polarization beam of a communication apparatus in accordance with an exemplary embodiment of the present invention.

As illustrated in FIG. 2, the dual polarization antenna array 110 may be an M×1 linear array. Each terminal may send a reference signal during an uplink section. As illustrated in FIG. 2, a reception polarization monitored by the communication apparatus 100, that is, a base station, may have various shapes depending on the location of the antennas of each terminal.

The reception unit 120 receives a reference signal transmitted by each terminal through the dual polarization antenna array 110 and delivers the received reference signal to the azimuth and polarization estimation unit 130.

The azimuth and polarization estimation unit 130 estimates the azimuth and polarization of each terminal using the reference signal of the terminal received through the dual polarization antenna array 110.

The control unit 140 determines a transmission stream based on the estimated azimuth and polarization of each terminal, and sends azimuth and polarization information according to each transmission stream to a corresponding transmission beamforming unit and transmission polarization forming unit of the plurality of transmission beamforming units 154$_1$-154$_N$ and the plurality of transmission polarization forming units 156$_1$-156$_N$.

The plurality of transmission signal processing units 152$_1$-152$_N$ perform a series of communication signal processing on respective transmission streams S1-SN. For example, each of the transmission signal processing units 152$_1$-152$_N$ may perform channel coding, interleaving, and data modulation.

The plurality of transmission beamforming units 154$_1$-154$_N$ receive communication signal-processed signals from the plurality of transmission signal processing units 152$_1$-152$_N$, respectively, and perform beamforming on the received signals using a steering vector. Each of the plurality of transmission beamforming units 154$_1$-154$_N$ generates a steering vector, including the weight value of the plurality of dual polarization antennas, based on an azimuth received from the control unit 140. If an azimuth is $\theta_d$, a steering vector may be generated as in Equation 1. The generated steering vector may be applied to each antenna element that forms the azimuth in the dual polarization antenna array 110.

$$A(\theta_d) = \begin{bmatrix} 1 \\ e^{-j\frac{2\pi\delta}{\lambda}\sin(\theta_d)} \\ \vdots \\ e^{-j\frac{2\pi\delta(M-1)}{\lambda}\sin(\theta_d)} \end{bmatrix} \quad \text{(Equation 1)}$$

In Equation 1, M is the number of dual polarization antennas forming a dual polarization antenna array, δ is the distance between the dual polarization antennas, and λ is a wavelength.

Each of the plurality of transmission polarization forming units 156$_1$-156$_N$ polarizes a signal, beamformed by each of the plurality of transmission beamforming units 154$_1$-154$_N$, into a vertical component and a horizontal component based on azimuth and polarization information received from the control unit 140, and generates a vertical polarization signal and a horizontal polarization signal. More specifically, each of the plurality of transmission polarization forming units 156$_1$-156$_N$ may calculate the horizontal component weight value and vertical component weight value of each of the plurality of dual polarization antennas based on the azimuth and polarization information received from the control unit 140, and may generate the vertical polarization signal and the horizontal polarization signal by multiplying the calculated horizontal component weight value and vertical component weight value by the horizontal component weight value and vertical component weight value of a dual polarization antenna corresponding to a signal beamformed in accordance with each of the dual polarization antennas. The horizontal component weight value and vertical component weight value of each of the dual polarization antennas may be calculated as in Equation 2.

$$\begin{bmatrix} H_1 \\ V_1 \end{bmatrix} = \begin{bmatrix} -\cos(\gamma_d) \\ \sin(\gamma_d)e^{j\eta_d}\cos(\theta_d)\frac{\alpha_1}{\beta_1} \end{bmatrix} \quad \text{(Equation 2)}$$

$$\begin{bmatrix} H_k \\ V_k \end{bmatrix} = \begin{bmatrix} -\cos(\gamma_d)\frac{\alpha_1}{\alpha_k} \\ \sin(\gamma_d)e^{j\eta_d}\cos(\theta_d)\frac{\alpha_1}{\beta_1} \end{bmatrix}$$

In Equation 2, $\alpha_i$ and $\beta_i$ indicate the RF responses of the horizontal component and vertical component of an i-th dual polarization antenna.

The plurality of combination units $160_1$-$160_M$ may include horizontal component combination units $162_1$-$162_M$ and vertical component combination units $164_1$-$164_M$, respectively. Each of the horizontal component combination units $162_1$-$162_M$ combines the horizontal component signals of corresponding dual polarization antennas in a plurality of transmission streams, and delivers the combined horizontal component signal Hs to each of the OFDMA modulation units $170_1$-$170_M$. Each of the vertical component combination units $164_1$-$164_M$ combines the vertical component signals of corresponding dual polarization antennas in a plurality of transmission streams, and delivers the combined vertical component signal Vs to each of the OFDMA modulation units $170_1$-$170_M$.

Each of the OFDMA modulation units $170_1$-$170_M$ performs OFDM modulation on the horizontal component signal Hs and vertical signal component Vs of each dual polarization antenna, adds a Cyclic Prefix (CP) to the OFDM-modulated signal, and sends the resulting signal to each dual polarization antenna through each of the transmission units $180_1$-$180_M$.

The transmission units $180_1$-$180_M$ may include respective RF units $182_1$-$182_M$ corresponding to a horizontal component and respective RF units $184_1$-$184_M$ corresponding to a vertical component. The RF units $182_1$-$182_M$ and the RF units $184_1$-$184_M$ process respective signals and send the processed signals to the respective dual polarization antennas $112_1$-$112_M$.

The plurality of dual polarization antennas $112_1$-$112_M$ of the dual polarization antenna array 110 send signals received through the transmission units $180_1$-$180_M$. Each transmission stream may be transmitted to a corresponding terminal through a polarization-matched beam through each of the dual polarization antennas $112_1$-$112_M$ as illustrated in FIG. 3.

At least some functions of the polarization beamforming communication method and apparatus according to an exemplary embodiment of the present invention may be implemented by hardware or may be implemented by software combined with hardware. For example, a processor implemented as a central processing unit (CPU) or any other chip set, a microprocessor, and the like may perform the functions of the azimuth and polarization estimation unit 130, the control unit 140, the plurality of stream processing units $150_1$-$150_N$, the plurality of combination units $160_1$-$160_M$, and the plurality of OFDMA modulation units $170_1$-$170_M$, and the transceiver includes the dual polarization antenna array 110, may perform functions of the reception unit 120, and the plurality of transmission units $180_1$-$180_M$.

Figure 4:
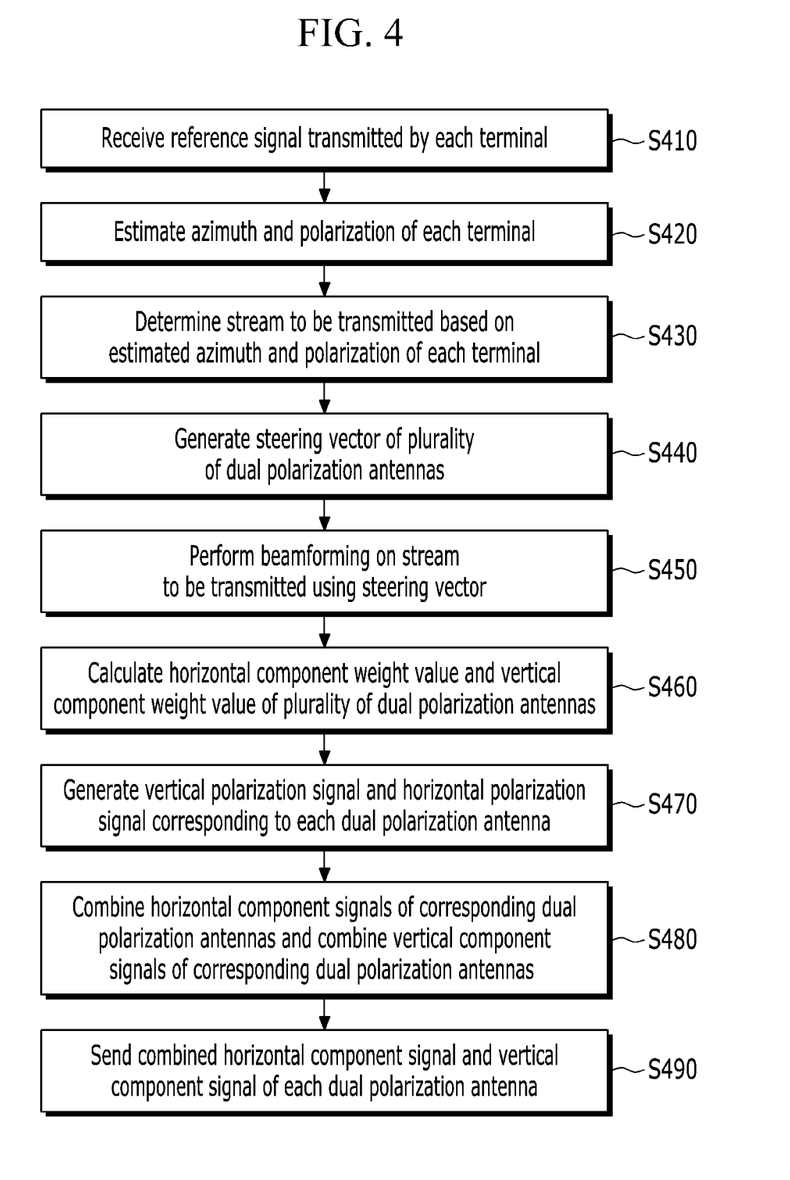
FIG. 4 is a flowchart illustrating the communication method of the communication apparatus illustrated in FIG. 1.

FIG. 4 is a flowchart illustrating the communication method of the communication apparatus illustrated in FIG. 1.

Referring to FIG. 4, the reception unit 120 receives a reference signal transmitted by each terminal through the dual polarization antenna array 110 at step S410.

The azimuth and polarization estimation unit 130 estimates the azimuth and polarization of each terminal using the reference signal of the terminal received through the dual polarization antenna array 110 at step S420.

The control unit 140 determines a stream to be transmitted to each terminal based on the estimated azimuth and polarization of the terminal at step S430, and sends azimuth and polarization information for each stream to be transmitted to each transmission beamforming unit and transmission polarization forming unit.

A transmission beamforming unit that belongs to the plurality of transmission beamforming units $154_1$-$154_N$ and that corresponds to a stream to be transmitted generates a steering vector for the plurality of dual polarization antennas based on the azimuth received from the control unit 140 at step S440, and performs beamforming on the stream to be transmitted using the steering vector at step S450.

A transmission polarization forming unit that belongs to the plurality of transmission polarization forming units $156_1$-$156_N$ and that corresponds to a stream to be transmitted calculates the horizontal component weight value and vertical component weight value of the plurality of dual polarization antennas based on the azimuth and polarization information received from the control unit 140 at step S460, and generates a vertical polarization signal and horizontal polarization signal corresponding to each of the dual polarization antennas by multiplying the calculated horizontal component weight value and vertical component weight value by the horizontal component weight value and vertical component weight value of a dual polarization antenna corresponding to a stream that has been beamformed in accordance with each of the dual polarization antennas at step S470.

Each of the plurality of combination units $160_1$-$160_M$ combines the horizontal component signals of corresponding dual polarization antennas in the stream to be transmitted, and combines the vertical component signals of the corresponding dual polarization antennas at step S480.

The horizontal component signal and the vertical component signal of each of the dual polarization antennas are subjected to OFDM modulation and transmitted through each of the dual polarization antennas at step S490.

Figure 5:
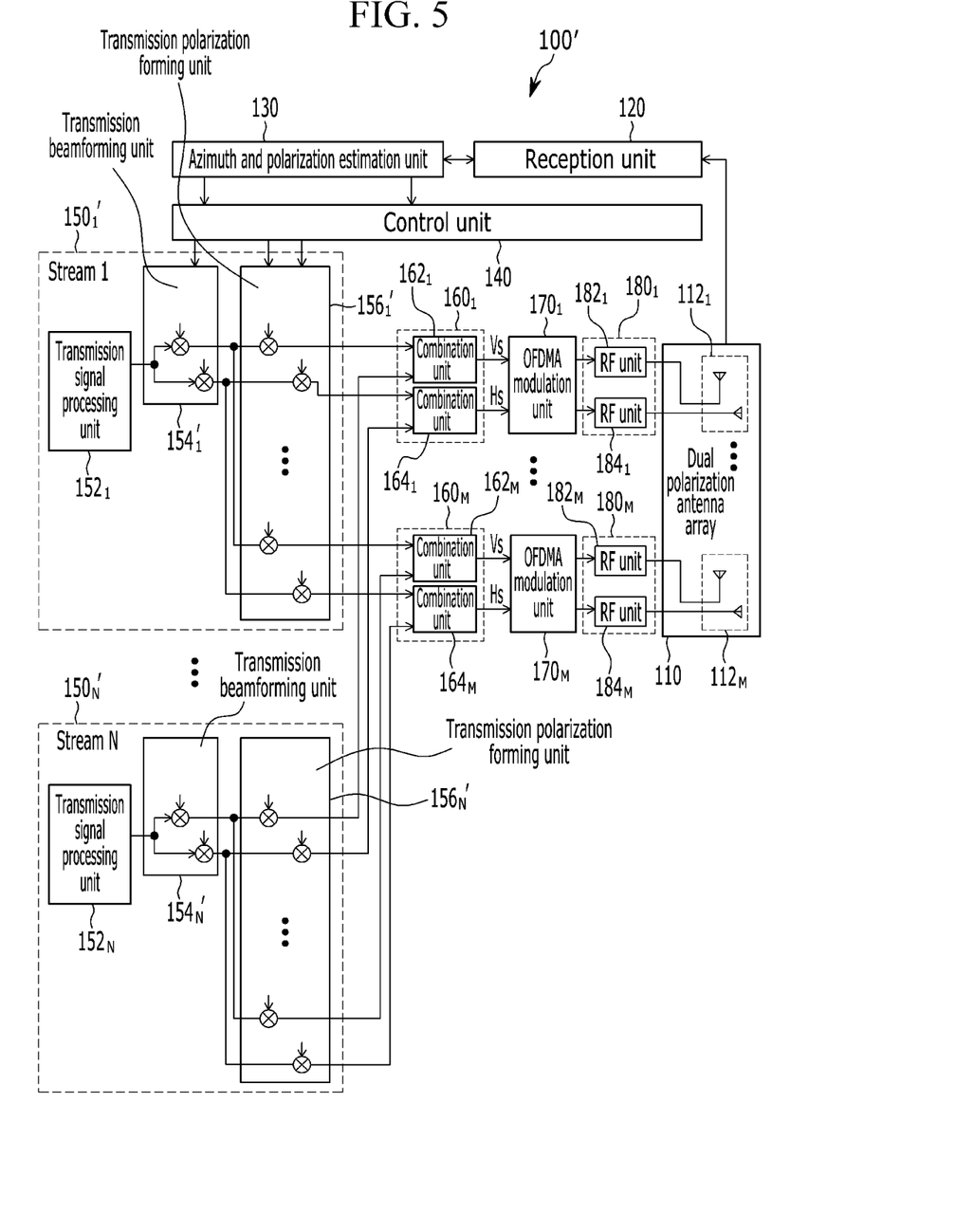
FIG. 5 is a diagram illustrating a communication apparatus in accordance with another exemplary embodiment of the present invention.

FIG. 5 is a diagram illustrating a communication apparatus in accordance with another exemplary embodiment of the present invention.

Referring to FIG. 5, the communication apparatus 100' is the same as the communication apparatus 100 except a plurality of stream processing units $150_1'$-$150_N'$.

In transmission polarization forming units $156_1'$-$156_N'$ of the plurality of stream processing units $150_1'$-$150_N'$, the RF response of the horizontal and vertical components of each of dual polarization antennas is not taken into consideration, unlike in FIG. 1. Accordingly, the horizontal component weight value and vertical component weight value of each of the dual polarization antennas do not need to be calculated as in FIG. 1.

Each of the transmission polarization forming units $156_1'$-$156_N'$ calculates a single horizontal component weight value and a single vertical component weight value based on polarization information received from the control unit 140, generates a plurality of vertical polarization signals and a plurality of horizontal polarization signals by multiplying a communication signal-processed signal, received from each of a plurality of transmission signal processing units $152_1$-$152_N$, by the horizontal component weight value and the vertical component weight value, and sends the plurality of vertical polarization signals and the plurality of horizontal polarization signals to each of a plurality of transmission beamforming units $154_1'$-$154_N'$. In this case, the horizontal component weight value and the vertical component weight value may be calculated as in Equation 3.

$$\begin{bmatrix} H \\ V \end{bmatrix} = \begin{bmatrix} -\cos(\gamma_d) \\ \sin(\gamma_d)e^{j\eta_d}\cos(\theta_d) \end{bmatrix} \quad \text{(Equation 3)}$$

Each of the plurality of transmission beamforming units $154_1'$-$154_N'$ performs beamforming on a vertical polarization signal and horizontal polarization signal, received from each of the transmission polarization forming units $156_1'$-$156_N'$, using a steering vector illustrated in Equation 1, and sends the beamformed vertical polarization signal and horizontal polarization signal to each of the combination units $160_1$-$160_M$.

Figure 6:
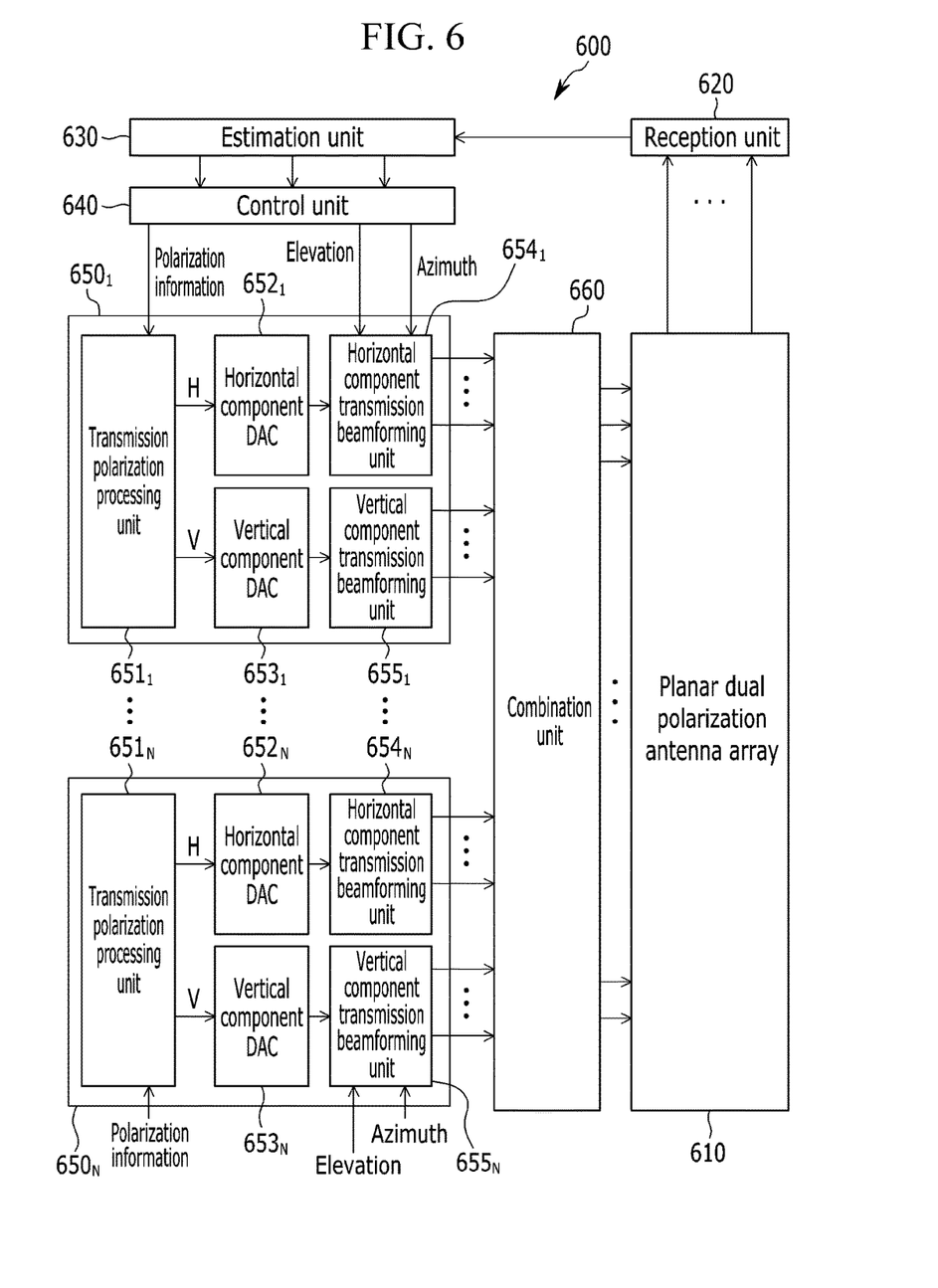
FIG. 6 is a diagram illustrating a polarization beamforming communication apparatus in accordance with yet another exemplary embodiment of the present invention.
Figure 7:
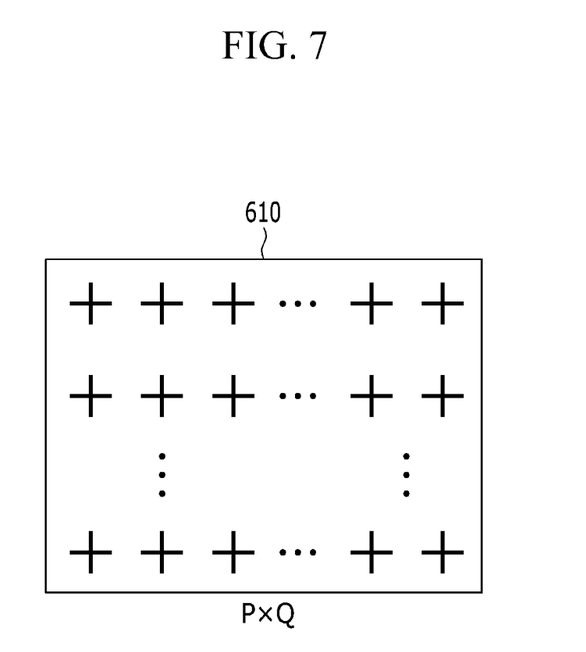
FIG. 7 is a diagram illustrating a dual polarization antenna array of FIG. 6.
Figure 8:
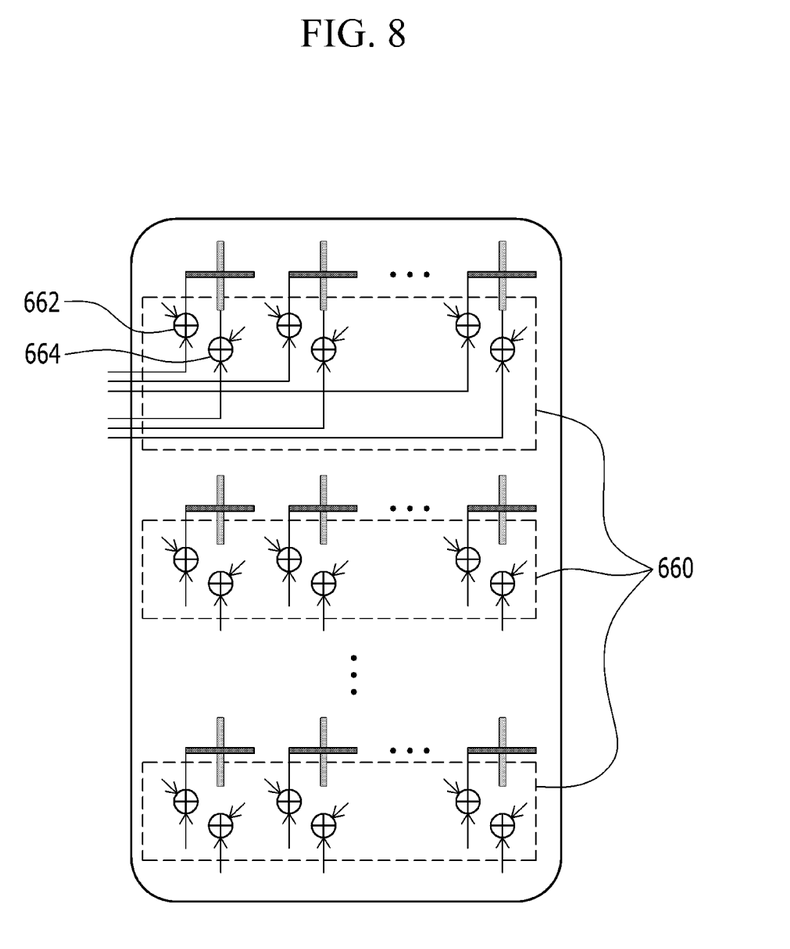
FIG. 8 is a diagram illustrating a combination unit of FIG. 7.

FIG. 6 is a diagram illustrating a polarization beamforming communication apparatus in accordance with yet another exemplary embodiment of the present invention, FIG. 7 is a diagram illustrating a dual polarization antenna array of FIG. 6, and FIG. 8 is a diagram illustrating a combination unit of FIG. 7.

Referring to FIG. 6, the communication apparatus 600 for polarization beamforming may include a planar dual polarization antenna array 610, a reception unit 620, an estimation unit 630, a control unit 640, a plurality of stream processing units $650_1$-$650_N$, and a combination unit 660. A processor implemented as a central processing unit (CPU) or any other chip set, a microprocessor, and the like may perform the functions of the estimation unit 630, the control unit 640, the plurality of stream processing units $650_1$-$650_N$, and the combination unit 660, and the transceiver includes the planar dual polarization antenna array 610, and the reception unit 620.

The plurality of stream processing units $650_1$-$650_N$ may respectively include a plurality of transmission polarization processing units $651_1$-$651_N$, a plurality of horizontal component DACs $652_1$-$652_N$, a plurality of vertical component DACs $653_1$-$653_N$, a plurality of horizontal component transmission beamforming units $654_1$-$654_N$, and a plurality of vertical component transmission beamforming units $655_1$-$655_N$. In this case, N is a maximum number of transmission streams that may be transmitted by the communication apparatus 600.

Referring to FIG. 7, the planar dual polarization antenna array 610 may include a P×Q antenna array. The planar dual polarization antenna array 610 may include Q dual polarization antennas of each row arranged at a predetermined interval in an azimuth direction, and P dual polarization antenna of each column arranged at a predetermined interval in an elevation direction.

The reception unit 620 receives a reference signal transmitted by each terminal through the planar dual polarization antenna array 610 and delivers the received reference signal to the estimation unit 630.

The estimation unit 630 estimates the azimuth, elevation, and polarization of each terminal using the reference signal of the terminal received through the planar dual polarization antenna array 610.

The control unit 640 determines a stream to be transmitted based on the azimuth, elevation, and polarization of each terminal, and sends azimuth, elevation, and polarization information, corresponding to each stream, to each of the stream processing units $650_1$-$650_N$.

For convenience of description, the stream processing unit $650_1$ of the plurality of stream processing units $650_1$-$650_N$ is described as a representative example, and the remaining stream processing units $650_2$-$650_N$ may perform the same function as or a similar function to the stream processing unit $650_1$.

The transmission polarization processing unit $651_1$ of the stream processing unit $650_1$ performs the functions of the transmission signal processing unit $152_1$ and the transmission polarization forming unit $156_1$ of FIG. 1. Furthermore, the transmission polarization processing unit $651_1$ may perform the function of the OFDMA modulation unit of FIG. 1. That is, the transmission polarization processing unit $651_1$ performs a series of signal processing on a stream to be transmitted, and calculates a horizontal component weight value and a vertical component weight value based on an azimuth, an elevation, and polarization information corresponding to the stream to be transmitted. Furthermore, the transmission polarization processing unit $651_1$ generates a horizontal polarization signal H and a vertical polarization signal V by multiplying a signal that has been subjected to signal processing by the horizontal component weight value and the vertical component weight value, and respectively outputs the horizontal polarization signal H and the vertical polarization signal V to the horizontal component DAC $652_1$ and the vertical component DAC $653_1$.

The horizontal component DAC $652_1$ converts the horizontal polarization signal H from a digital signal to an analog signal and outputs the analog signal to the horizontal component transmission beamforming unit $654_1$.

The vertical component DAC $653_1$ converts the vertical polarization signal V from a digital signal to an analog signal and outputs the analog signal to the vertical component transmission beamforming unit $655_1$.

The analog signals converted by the horizontal component DAC $652_1$ and the vertical component DAC $653_1$ may be subjected to power amplification and transmitted to the horizontal component transmission beamforming unit $654_1$ and the vertical component transmission beamforming unit $655_1$.

The horizontal component transmission beamforming unit $654_1$ generates a steering vector, including the weight value for each of the plurality of dual polarization antennas, based on an azimuth and elevation received from the control unit 140, performs beamforming on the horizontal polarization signal converted into the analog signal using the steering vector, and sends the beamformed horizontal polarization signal to the combination unit 660.

The vertical component transmission beamforming unit $655_1$ generates a steering vector, including the weight value of each of the plurality of dual polarization antennas, based on an azimuth and elevation received from the control unit 140, performs beamforming on the vertical polarization signal converted into the analog signal using the steering vector, and sends the beamformed vertical polarization signal to the combination unit 660.

Each of the horizontal component transmission beamforming unit $654_1$ and the vertical component transmission beamforming unit $655_1$ may generate a steering vector corresponding to the azimuth as in Equation 1, and generate a steering vector corresponding to the elevation in a similar way. The steering vector corresponding to the azimuth may be applied to each row of the planar dual polarization antenna array 610, and the steering vector corresponding to the elevation may be applied to each column of the planar dual polarization antenna array 610.

In this case, a single beamforming unit may perform all the functions of the horizontal component transmission beamforming unit $654_1$ and the vertical component transmission beamforming unit $655_1$.

The combination unit 660 performs the function of the combination units $160_1$-$160_M$ described with reference to FIG. 1.

Referring to FIG. 8, the combination unit 660 may include a horizontal component combination unit 662 and a vertical component combination unit 664 corresponding to each of the dual polarization antennas. The horizontal component combination unit 662 combines the horizontal component signals of a corresponding dual polarization antenna in each stream to be transmitted, and sends the combined horizontal component signal to the corresponding dual polarization antenna. The vertical component combination unit 664 combines the vertical component signals of a corresponding dual polarization antenna in each stream to be transmitted, and sends the combined vertical component signal to the corresponding dual polarization antenna.

The plurality of dual polarization antennas $612_1$-$612_L$ of the planar dual polarization antenna array 610 send the horizontal component signal and the vertical component signal received from the horizontal component combination unit 662 and the vertical component combination unit 664.

Figure 9:
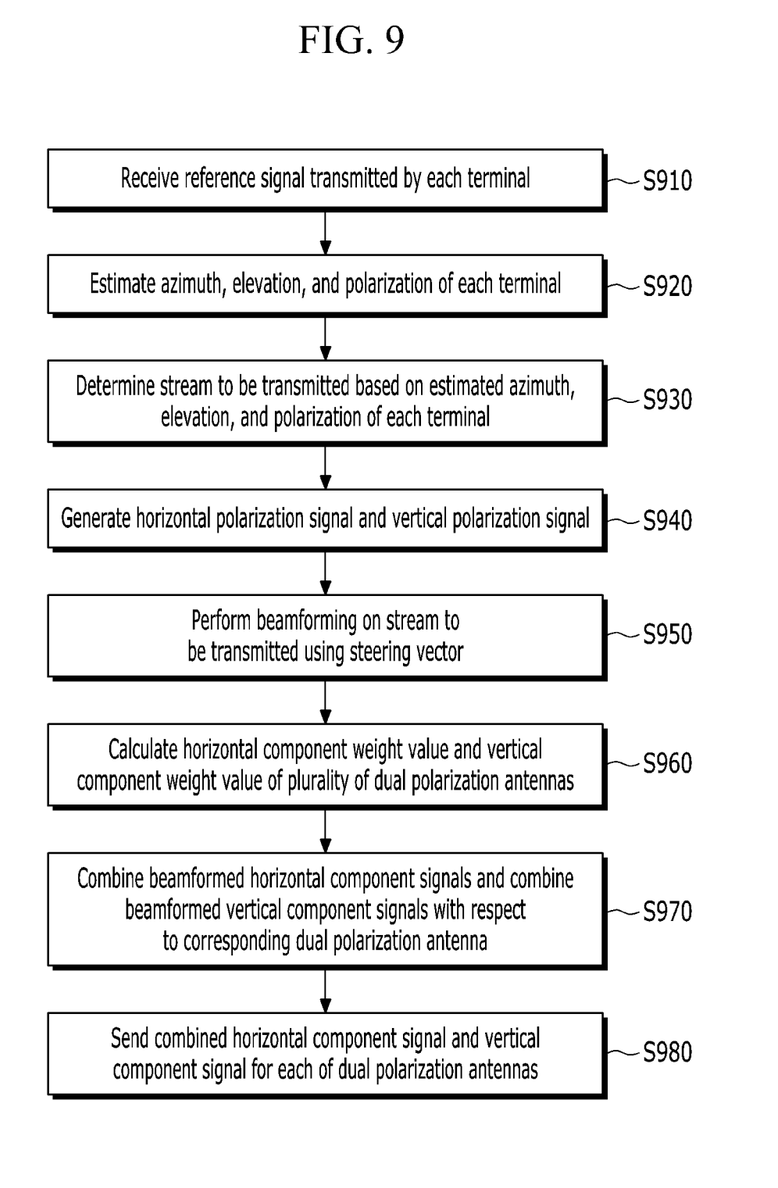
FIG. 9 is a flowchart illustrating the communication method of the polarization beamforming communication apparatus illustrated in FIG. 6.

FIG. 9 is a flowchart illustrating the communication method of the polarization beamforming communication apparatus illustrated in FIG. 6.

Referring to FIG. 9, the reception unit 620 receives a reference signal, transmitted by each terminal, through the planar dual polarization antenna array 610 at step S910.

The estimation unit 630 estimates the azimuth, elevation, and polarization of each terminal using the reference signal of the terminal received through the planar dual polarization antenna array 610 at step S920.

The control unit 640 determines a stream to be transmitted to each terminal based on the estimated azimuth, elevation, and polarization of the terminal at step S930, and sends azimuth, elevation, and polarization information for each stream to be transmitted to a corresponding streaming processing unit.

A stream processing unit that belongs to the plurality of stream processing units $650_1$-$650_N$ and corresponding to a stream to be transmitted generates a horizontal polarization signal H and a vertical polarization signal V based on an azimuth, an elevation, and polarization information corresponding to the stream to be transmitted at step S940, and converts the horizontal polarization signal H and the vertical polarization signal V into respective analog signals. Furthermore, the stream processing unit corresponding to the stream to be transmitted generates a steering vector for the plurality of dual polarization antennas based on the azimuth and elevation corresponding to the stream to be transmitted at step S950, and performs beamforming on the horizontal polarization signal H and the vertical polarization signal V using the steering vector at step S960.

The combination unit 660 combines the beamformed horizontal component signals of corresponding dual polarization antennas and combines the beamformed vertical component signals of the corresponding dual polarization antennas at step S970.

The horizontal component signal and the vertical component signal for each of the dual polarization antennas are transmitted through each of the dual polarization antennas at step S980.

In accordance with an exemplary embodiment of the present invention, in a communication environment in which a line-of-sight is dominant, communication transmission efficiency can be improved by estimating the azimuth, elevation, and polarization state of each terminal based on a signal transmitted by the terminal, generating a polarization-matched beam based on the estimated azimuth, elevation, and polarization state, and sending the generated beam to each terminal. Furthermore, transmission efficiency can be improved by carrying data of a maximum of two streams on orthogonal polarizations and sending the data through beamforming if a terminal includes a dual polarization antenna.

The exemplary embodiments of the present invention are not implemented only by the aforementioned method and/or apparatus, but may be implemented by a program for realizing a function corresponding to a construction according to an exemplary embodiment of the present invention or a recording medium on which the program has been recorded. Such an implementation will be evident to those skilled in the art to which the present invention pertains from the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarization beamforming communication method of a base station comprising a planar dual polarization antenna array, the communication method comprising:
   estimating an azimuth, elevation, and polarization of each of terminals using a reference signal of a respective terminal received through a plurality of dual polarization antennas of the planar dual polarization antenna array;
   determining a stream to be transmitted based on the azimuth, elevation, and polarization of each of the terminals;
   generating a horizontal polarization signal and a vertical polarization signal from the stream to be transmitted to the respective terminal using the azimuth, elevation, and polarization of the respective terminal;
   performing beamforming on the horizontal polarization signal and the vertical polarization signal to be transmitted to the respective terminal in accordance with each of the plurality of dual polarization antennas using the azimuth and elevation of the respective terminal; and
   delivering a beamformed horizontal polarization signal of the respective terminal for the dual polarization antenna and a beamformed vertical polarization signal of the respective terminal for the dual polarization antenna to a corresponding dual polarization antenna.

2. The communication method of claim 1, wherein performing beamforming comprises:
   generating a steering vector for the plurality of dual polarization antennas in accordance with the stream to be transmitted to the respective terminal using the azimuth and elevation of the respective terminal; and performing the beamforming on the horizontal polarization signal and the vertical polarization signal corresponding to the respective terminal using the steering vector corresponding to the respective terminal.

3. The communication method of claim 1, wherein generating the horizontal polarization signal and the vertical polarization signal comprises:

calculating a horizontal component weight value and a vertical component weight value of the terminal using the azimuth, elevation, and polarization of the respective terminal; and generating a horizontal component signal and a vertical component signal to be transmitted to the terminal by respectively multiplying the horizontal component weight value and vertical component weight value by a horizontal component weight value and a vertical component weight value of a dual polarization antenna corresponding to the stream to be transmitted to the terminal.

4. The communication method of claim 1, wherein delivering comprises:

combining beamformed horizontal polarization signals of the respective terminal for each of the dual polarization antennas;

combining beamformed vertical polarization signals of the respective terminal for each of the dual polarization antennas; and sending the combined horizontal polarization signal and the combined vertical polarization signal through a corresponding dual polarization antenna.

5. The communication method of claim 2, wherein generating the steering vector comprises:

generating a steering vector horizontal component corresponding to the azimuth to be applied to each row of the planar dual polarization antenna array using the azimuth; and generating a steering vector vertical component corresponding to the elevation to be applied to each column of the planar dual polarization antenna array using the elevation.

6. The communication method of claim 1, wherein generating the horizontal polarization signal and the vertical polarization signal comprises:

generating a horizontal component weight value of the dual polarization antenna in the planar dual polarization antenna array using a horizontal component of the polarization; and generating a vertical component weight value of the dual polarization antenna in the planar dual polarization antenna array using a vertical component of the polarization.

7. A polarization beamforming communication apparatus of a base station, comprising:

a planar dual polarization antenna array configured to comprise a plurality of dual polarization antennas;

an estimation unit configured to estimate an azimuth, elevation, and polarization of each of terminals from a reference signal received from a respective terminal through the planar dual polarization antenna array;

a control unit configured to determine a stream to be transmitted based on the azimuth, elevation, and polarization of each of the terminals;

a transmission polarization processing unit configured to generate a horizontal polarization signal and a vertical polarization signal from the stream to be transmitted to the respective terminal using the azimuth, elevation, and polarization of the respective terminal;

a transmission beamforming unit configured to perform beamforming on the horizontal polarization signal and the vertical polarization signal to be transmitted to the respective terminal in accordance with each of the plurality of dual polarization antennas using the azimuth and elevation of the respective terminal; and a combination unit configured to deliver a beamformed horizontal polarization signal of the respective terminal for the dual polarization antenna and a beamformed vertical polarization signal of the respective terminal for the dual polarization antenna to a corresponding dual polarization antenna.

8. The communication apparatus of claim 7, wherein the transmission beamforming unit generates a steering vector for the plurality of dual polarization antennas in accordance with the respective terminal using the azimuth and elevation of the respective terminal, and performs beamforming on the vertical polarization signal and horizontal polarization signal to be transmitted to the respective terminal using respective corresponding steering vectors.

9. The communication apparatus of claim 7, wherein the transmission polarization processing unit calculates a horizontal component weight value and a vertical component weight value of the respective terminal using the azimuth, elevation, and polarization of the respective terminal, and generates a horizontal component signal and a vertical component signal to be transmitted to the respective terminal by respectively multiplying the stream to be transmitted to the respective terminal by the horizontal component weight value and the vertical component weight value.

10. The communication apparatus of claim 7, wherein the combination unit comprises:

a horizontal component combination unit corresponding to each of the dual polarization antennas; and a vertical component combination unit corresponding to each of the dual polarization antennas, wherein the horizontal component combination unit combines beamformed horizontal component signals of the respective terminal for a corresponding dual polarization antenna, and the vertical component combination unit combines beamformed vertical component signals of the respective terminal for a corresponding dual polarization antenna.

11. The communication apparatus of claim 7, wherein the transmission beamforming unit generates a steering vector horizontal component corresponding to the azimuth to be applied to each row of the planar dual polarization antenna array using the azimuth, and generates a steering vector vertical component corresponding to the elevation to be applied to each column of the planar dual polarization antenna array using the elevation.

12. The communication apparatus of claim 7, wherein the transmission polarization processing unit generates a horizontal component weight value and a vertical component weight value of the dual polarization antenna in the planar dual polarization antenna array using horizontal and vertical components of the polarization, and generates the horizontal polarization signal and the vertical polarization signal by applying the horizontal component weight value and the vertical component weight value to the stream to be transmitted to the respective terminal.

* * * * *